(12) United States Patent
Kim

(10) Patent No.: US 8,217,904 B2
(45) Date of Patent: Jul. 10, 2012

(54) MOBILE TERMINAL AND SCREEN DISPLAY METHOD THEREOF

(75) Inventor: Jin Woong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1124 days.

(21) Appl. No.: 11/940,989

(22) Filed: Nov. 15, 2007

(65) Prior Publication Data

US 2008/0119237 A1    May 22, 2008

(30) Foreign Application Priority Data

Nov. 16, 2006 (KR) .................. 10-2006-0113531

(51) Int. Cl.
*G09G 5/00* (2006.01)
(52) U.S. Cl. ........................... 345/173; 715/788
(58) Field of Classification Search .................. 345/156, 345/158, 173–179; 379/354, 356.01, 357.01, 379/93.17, 93.19; 455/566; 715/700, 780, 715/788, 800; 178/18.01, 18.03
See application file for complete search history.

(56) References Cited

U.S. PATENT DOCUMENTS

| | | | |
|---|---|---|---|
| 5,581,243 A * | 12/1996 | Ouellette et al. | 345/173 |
| 5,910,802 A | 6/1999 | Shields et al. | |
| 6,115,025 A | 9/2000 | Buxton et al. | |
| 6,833,817 B2 * | 12/2004 | Olsen | 343/702 |
| 2004/0017375 A1 * | 1/2004 | Lui et al. | |
| 2004/0036680 A1 | 2/2004 | Davis et al. | |
| 2006/0197750 A1 | 9/2006 | Kerr et al. | |
| 2006/0197753 A1 * | 9/2006 | Hotelling | 345/173 |
| 2007/0075978 A1 * | 4/2007 | Chung | 345/173 |
| 2008/0211784 A1 * | 9/2008 | Hotelling et al. | 345/173 |

FOREIGN PATENT DOCUMENTS

| | | |
|---|---|---|
| CN | 1357820 | 7/2002 |
| JP | 2003-150317 | 5/2003 |
| WO | 2006-020304 | 2/2006 |
| WO | 2006-040400 | 4/2006 |
| WO | 2006-094308 | 9/2006 |

* cited by examiner

*Primary Examiner* — Regina Liang
(74) *Attorney, Agent, or Firm* — Lee, Hong, Degerman, Kang & Waimey

(57) ABSTRACT

A mobile terminal and a screen display method of the mobile terminal are disclosed. The mobile terminal includes: a display that comprises a user interface display region and an information display region; and a controller that changes positions of display regions and displaying the changed positions on the display according to a user selection.

19 Claims, 11 Drawing Sheets

MOBILE TERMINAL AND SCREEN DISPLAY METHOD THEREOF

CROSS REFERENCE TO RELATED APPLICATION

Pursuant to 35 U.S.C. §119(a), this application claims the benefit of earlier filing date and right of priority to Korean Patent Application No. 10-2006-0113531, filed on Nov. 16, 2006, the contents of which are hereby incorporated by reference in their entirety.

BACKGROUND

The present invention relates to a mobile terminal and, more particularly, to a mobile terminal capable of changing a user interface displaying position according to a user selection, and its screen display method.

A mobile terminal is a mobile device that has one or more functions such as performing of voice and video call communication, data input/output, data storage, and the like.

With such diverse functions, the mobile terminal is evolving into a comprehensive multimedia device that can support various operations, such as capturing images or videos, reproducing music or video files, allowing the user to play games, receiving broadcast contents, and the like.

In order to implement complex functions, hardware and/or software implementations are being developed. For example, a user interface that allows the user to search for and select various functions is provided. There have been efforts to develop a more convenient and easier to use interface, but further improvements are needed.

SUMMARY

Therefore, in order to address the above matters, the various features described herein have been conceived by the present inventor. One aspect of the exemplary embodiments is to provide a mobile terminal that can change an indication position of a user interface according to a user selection, and a screen display method of such mobile terminal.

DETAILED DESCRIPTION

The mobile terminal and its screen display method according to the exemplary embodiments of the present invention will now be described.

Figure 1:
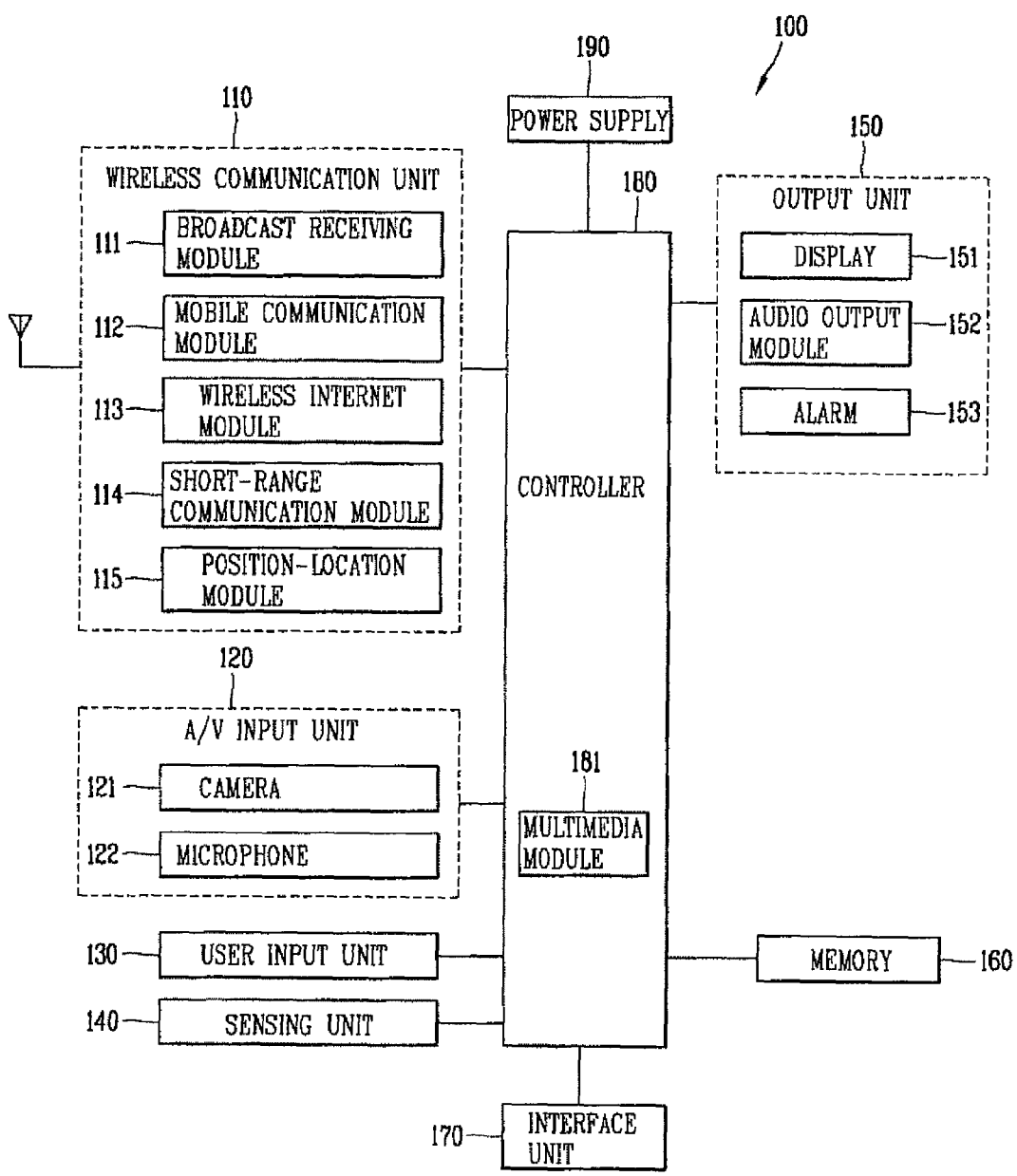
FIG. 1 is a schematic block diagram of a mobile terminal according to one exemplary embodiment.

FIG. 1 is a schematic block diagram of a mobile terminal according to one exemplary embodiment of the present invention. The mobile terminal may refer to a mobile phone, a smart phone, a notebook computer, a digital broadcast terminal, a PDA (Personal Digital Assistant), a PMP (Portable Multimedia Player), a GPS navigation device, and the like.

The mobile terminal as shown in FIG. 1 includes a wireless communication unit 110, an A/V (Audio/Video) input unit 120, a user input unit 130, a sensing unit 140, an output unit 150, a memory 160, an interface unit 170, a controller 180, and a power supply 190, as well as other elements. It should be noted that two or more elements may be combined into a single element or a single element may be divided into two or more elements when actually implemented.

The wireless communication unit 110 may include a broadcast receiving module 111, a mobile communication module 112, a wireless Internet module 113, a short-range communication module 114, a position-location module 115, or the like.

The broadcast receiving module 111 receives a broadcast signal and/or broadcast-associated information from an external broadcast management server through a broadcast channel. The broadcast channel may include a satellite channel, a terrestrial channel or some other type of communication channel. The broadcast management server may refer to a server (or other network device entity) that generates and transmits broadcast signals and/or broadcast-associated information or a server that receives previously generated broadcast signals and/or broadcast-associated information and transmits such to a terminal. The broadcast-associated information may refer to information related to a broadcast channel, a broadcast program, a broadcast service provider, etc. The broadcast signal may include, not only a TV broadcast signal, a radio broadcast signal, and a data broadcast signal, but also a broadcast signal obtained by combining a data broadcast signal with a TV broadcast signal or a radio broadcast signal.

The broadcast-associated information may be provided via a mobile communication network, and in such case, such information may be received by the mobile communication module 112.

The broadcast-associated information may be implemented in various formats. For example, the broadcast associated information may include an EPG (Electronic Program Guide) of a DMB (Digital Multimedia Broadcasting) format or an ESG (Electronic Service Guide) of a DVB-H (Digital Video Broadcast-Handheld) format, and the like.

The broadcast receiving module 111 receives broadcast signals by using various digital broadcast techniques. Particularly, digital broadcast signals can be received by using digital broadcast techniques, such as DMB-T (Digital Multimedia Broadcasting-Terrestrial), DMB-S (Digital Multimedia Broadcasting-Satellite, Media FLO (Media Forward Link Only), DVB-H, ISDB-T (Integrated Services Digital Broadcast-Terrestrial), and the like. Also, the broadcast receiving module 111 may be configured to be suitable for any other broadcast technique that provides broadcast signals and information.

The broadcast signal and/or broadcast-associated information received through the broadcast receiving module 111 may be stored in the memory 160.

The mobile communication module 112 transmits and receives radio signals to and from various devices, such as a base station, an external terminal and a server of a mobile communication network. Here, the radio signals may include voice call signals, video (or conference) call signals, data of various formats based upon the transmission and reception techniques used, text/multimedia messages, and other types of information.

The wireless Internet module 113 refers to a module that supports a wireless access to a network (such as the Internet), and may be installed in the mobile terminal or may be implemented as an external element that can be connected to the mobile terminal.

The short-range communication module 114 refers to a module that supports short-range communications. Suitable technologies for implementing this module may include Bluetooth™, RFID (Radio Frequency Identification), IrDA (Infrared Data Association), UWB (Ultra Wideband), ZigBee™, and the like.

The position-location module 115 acquires certain location or position information related to the mobile terminal 100. The position-location module 115 can be embodied by using GPS (Global Positioning System) technology.

The A/V input unit 120 is configured to receive audio signals or video signals and may include a camera unit 121, a microphone 122, etc. The camera unit 121 processes image frames for still images, videos, and the like, that are obtained by an image sensor (or other image capture device) in a video call (or video conference) mode or in an image capture mode. The processed images may then be displayed on the display 151.

The images processed by the camera unit 121 may be stored in the memory 160 (or other storage device) or transmitted via the wireless communication unit 110. Two or more camera units 121 may be provided according to the configuration and characteristics of the terminal.

The microphone 122 detects the user's voice or other sounds (audio) in a calling mode, recording mode or voice recognition mode, etc., and processes such into audio (voice) data. In case of the calling mode, the processed voice data may be converted for output into a format that can be transmittable to a mobile communication base station (or other network entity) via the mobile communication module 112. The microphone 122 may include various types of noise canceling algorithms (or other processing mechanisms) to cancel noise generated in the course of detecting the user's voice or other sounds.

The user input unit 130 generates key input data based on user inputs to control the operation of the terminal. The user input unit 130 may be formed as a keypad, a dome switch, a touch pad or surface (e.g., employing touch recognition techniques based on pressure, capacitance, resistance, etc.), a jog wheel (or jog dial switch), a thumbwheel, function buttons, and the like. In particular, when the touch pad is combined with the display 151 in a layered manner, such may be called a touch screen.

The sensing unit 140 senses a current state (or configuration) of the mobile terminal 100 (such as an opened or closed state), a location (or orientation) of the mobile terminal 100, or whether the user has touched certain portions of the mobile terminal 100, and the like. Based on such sensing, a control signal for controlling the operation of the mobile terminal 100 is generated. For example, if the mobile terminal is a slide-type phone, the sensing unit 140 can sense whether a slide portion of the slide-type mobile terminal is opened or closed (e.g., slid up or down or otherwise moved) with respect to a main body portion of the mobile terminal. In addition, the sensing unit 140 can perform a sensing function to detect whether or not the power supply 190 (such as a battery or external power charger) supplies power or whether or not the interface unit 170 (such as a connection port) is connected with an external device.

The interface unit 170 serves to interface with various external devices that can be connected with the mobile terminal 100. For example, the external devices may include a wired or wireless headset, an external charger, a wired or wireless data port, a card socket (e.g., for coupling a memory card, a SIM/UIM card), an audio I/O (Input/Output) port, a video I/O port, an earphone, and the like. The interface unit 170 may be used to receive data from the external device or be provided with power, such that the received data or power can be delivered to particular elements of the mobile terminal 100 or may be used to transmit data and other information from the mobile terminal 100 to the external device.

The output unit 150 is configured to provide various types of outputs (e.g., visual, audible, tactile outputs based on audio signals, video signals, alarm signals, etc.), and may include a display 151, an audio output module 152, and an alarm module 153.

The display 151 outputs information processed by the mobile terminal 100. For example, when the mobile terminal is in a calling mode, the display 151 displays a particular UI (User Interface) or GUI (Graphic User Interface) related to the call operation. When the mobile terminal 100 is in a video calling mode or an image capturing mode, the display 151 displays a captured and/or received image, or a particular UI and/or GUI.

As stated above, when the display 151 and the touch pad are formed together as a touch screen, the display 151 may be also used as an input device as well as an output device. The display 151 may include at least one of a liquid crystal display (LCD), a thin film transistor LCD, an organic light emitting diode, a flexible display, a three-dimensional (3D) display, and other types of display means. The mobile terminal 100 may include two or more of such displays (e.g., dual display screens, internal and external display screens, etc.) according to the particular embodiment. Namely, the mobile terminal 100 may include one or more internal and external displays.

The audio output module 152 outputs audio data which has been received from the wireless communication unit 110 in a call signal reception mode, a calling mode, a recording mode, a voice recognition mode, a broadcast reception mode, etc., or outputs audio data which has been stored in the memory 160. In addition, the audio output module 152 outputs an audio signal related to a function (e.g., a call signal reception sound, a message reception sound, etc.) performed by the mobile terminal 100. The audio output module 152 may include a speaker, a buzzer, and the like.

The alarm unit 153 may output a signal that informs about occurrence of an event of the mobile terminal 100. The event occurring in the mobile terminal may be, for example, a call signal reception, a message reception, a key signal input, or the like. The alarm unit 153 outputs a signal informing about occurrence of an event in a different format other than an audio signal or a video signal. For example, the alarm unit 153 may output a signal in the form of vibration. When a call signal or a message is received, the alarm unit 153 may output vibration in order to inform about the received call signal or message. Or, when a key signal is inputted, the alarm unit 153 may output vibrations as a feedback of the inputted key signal. Due to the vibrations, the user can recognize the occurrence of an event. Additionally or alternatively, the occurrence of an event may be informed to the user via the display 151 and/or the audio output module 152.

The memory 160 may store a software program (or codes, instructions, etc.) used to support the processing and controlling performed by the controller 1801 and may perform a function for temporarily storing inputted or outputted data (e.g., a phone book, a message, a still image, or video, etc.).

The memory 160 may include a storage medium of at least one of a flash type memory, a hard disk type memory, a multimedia card, a card type memory (e.g., SD card, XD card, etc.), a RAM, a ROM, just to name a few. In addition, the mobile terminal 100 may cooperate with a network storage device that can perform the storage function of the memory 160 via network access (such as via the Internet).

The controller 180 controls the general operations of the mobile terminal. For example, the controller 180 performs the controlling and processing related to handling a voice call, data communication, a video call, and the like. In addition, the controller 180 may include a multimedia module 181 for reproducing multimedia data. The multimedia module 181 may be formed as a hardware component within the controller 180 or may be formed as a software component separately from the controller 180 or may use an combination of hardware and software.

The power supply 190 receives external power (i.e., from a power charger) or internal power (i.e. from a battery of the mobile terminal) and supplies the power required for the operation of various elements under the control of the controller 180.

In the above description, the mobile terminal according to the present invention has been explained in terms of elements from the perspective of their functions. Hereinafter, the mobile terminal according to the present invention will be explained in terms of the external elements with reference to FIGS. 2 and 3. For simplicity, the slide-type mobile terminal (among various types of mobile terminals such as a folder type, a bar type, a swing type, a slider type, etc.) will be referred to for explaining the exemplary embodiments. However, it can be clearly understood that the features described herein are not limited to a slide-type mobile terminal, but can be applicable to any type of mobile terminal.

Figure 2:
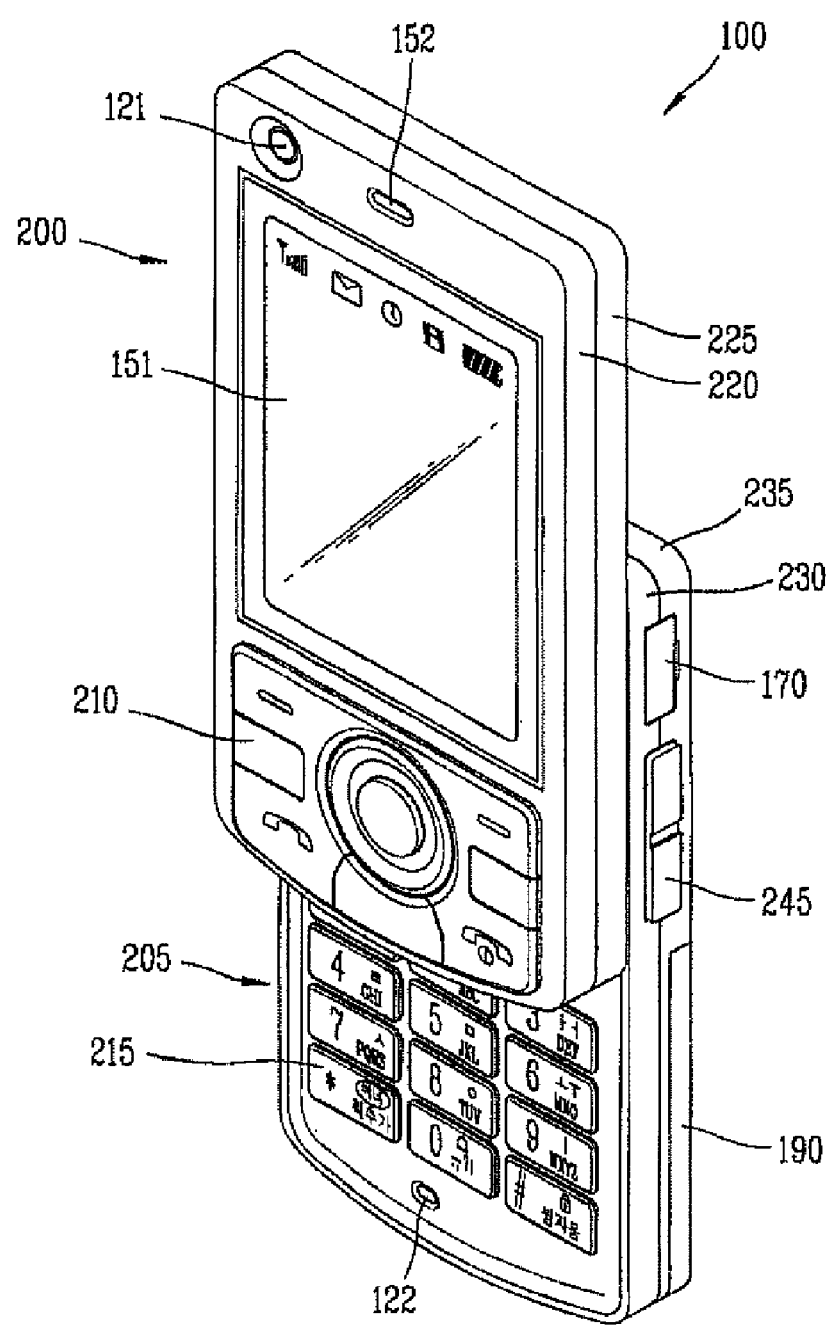
FIG. 2 is a front perspective view of the mobile terminal according to one exemplary embodiment.

FIG. 2 is a front perspective view of the mobile terminal according to one exemplary embodiment.

The mobile terminal includes a first body 200 and a second body 205 formed to be slidably moved along at least one direction on the first body 200.

A state in which the first body 200 is disposed to overlap with the second body 205 may be called a closed configuration, and as shown in FIG. 2, a state in which the first body 200 has been moved to expose at least a portion of the second body 250 may be called an open configuration.

In the closed configuration, the mobile terminal operates mainly in a standby mode (idle mode), and the standby mode may be released (exited) according to a user manipulation. In the open configuration, the mobile terminal operates mainly in the calling mode or the like, and the operation state may be changed into the standby mode upon lapse of a certain time or due to user manipulation.

The case (a casing, a housing, a cover, etc.) constituting the external appearance of the first body 200 consists of a first front case 220 and a first rear case 225, and various electronic components are installed in a space therebetween. One or more intermediate cases may be additionally disposed between the first front case 220 and the first rear case 225.

The cases may be formed by injection-molding of a synthetic resin or may be made of a metallic material, such as stainless steel (STS) or titanium (Ti), or the like.

On the first body 200 (e.g., substantially on the first front case 220) the display 151, the first audio output module 152, the first camera 121 or a first user input unit 210 may be disposed.

The display 151 includes an LCD (Liquid Crystal Display), an OLED (Organic Light Emitting Diode), or the like, that displays information to be viewed.

A touch pad (or similar element) may be overlaid (overlapped, superimposed, covered) on the display 151 in a layered manner to allow the display 151 to operate as a touch screen, whereby the user may input information or commands by touching the display 151. Various methods of touching (such as tapping, pressing, swiping, multiple tapping, using two or more simultaneous finger touching, etc.) may be employed.

The first audio output module 152 may be implemented as a receiver or a speaker to output various types of sounds.

The first camera module 121 may be implemented to be suitable for capturing still images, moving images, videos, or other visual information.

The first user input unit 210 receives user commands for executing one or more functions (such as making or receiving a call, a menu function, a message function, and the like) upon activation of one or more appropriate function keys (or buttons, etc.) to which a particular function has been allocated.

Like the first body 200, the case constituting the external appearance of the second body 205 consists of a second front case 230 and a second rear case 235.

A second user input unit 215 may be disposed on the second body, specifically, on a front face portion of the second front case 230.

A third user input unit 245, a microphone 122, and an interface unit 170 may be disposed on at least one of the second front case 230 or the second rear case 235.

The first to third user input units 210, 215 and 245 may be collectively referred to as the user input unit 130, and any means can be employed as the first to third user input units 210, 215 and 245 so long as it can be operated in a tactile manner.

For example, the user input unit 130 may be implemented by using one or more dome switches, touch sensitive membranes, etc. that can receive a user command or information according to a press or touch operation by the user, or may be implemented by using a mechanical manipulation means, such as a rotatable element (e.g., a wheel, dial, jog button, thumbwheel, etc.) or a linear movement element (e.g., a joystick, lever, knob, etc.).

In terms of their functions, the first user input unit 210 may comprise one or more function keys used for inputting a command such as start, end or scroll, etc., and the second user input unit 216 may comprise one or more keypads used for inputting numbers, characters, symbols, and the like.

The third user input unit 245 may be operated as a so-called hot key (or dedicated key, speed dial key, Internet access/connection enabling key, etc.) for activating a special function of the mobile terminal.

The microphone 122 may be implemented to be suitable for receiving a voice of the user or other sounds.

The interface unit 170 may be used as a link (path or passage) that allows data to be exchanged with an external device through a wired or wireless medium, For example, the interface unit 170 may be at least one of a connection port used for connection of an ear jack, earphones, and the like, a communication port that supports short-range communications (e.g., an IrDA port, a Bluetooth™ port, a wireless LAN port, etc.), and a power supply port used for supplying power to the mobile terminal.

The interface unit 170 may include a card socket (i.e. slot or other card receiving means) for receiving or accommodating a card-like medium, such as a SIM (Subscriber Identification Module) card, a UIM (User Identity Module) card, a memory card for storing information, and the like.

The power supply unit 190 may be mounted at the side (or edge) portion of the second rear case 235 to be used in supplying power to the mobile terminal. The power supply 190 may be a rechargeable battery, which can be attached with the mobile terminal.

Figure 3:
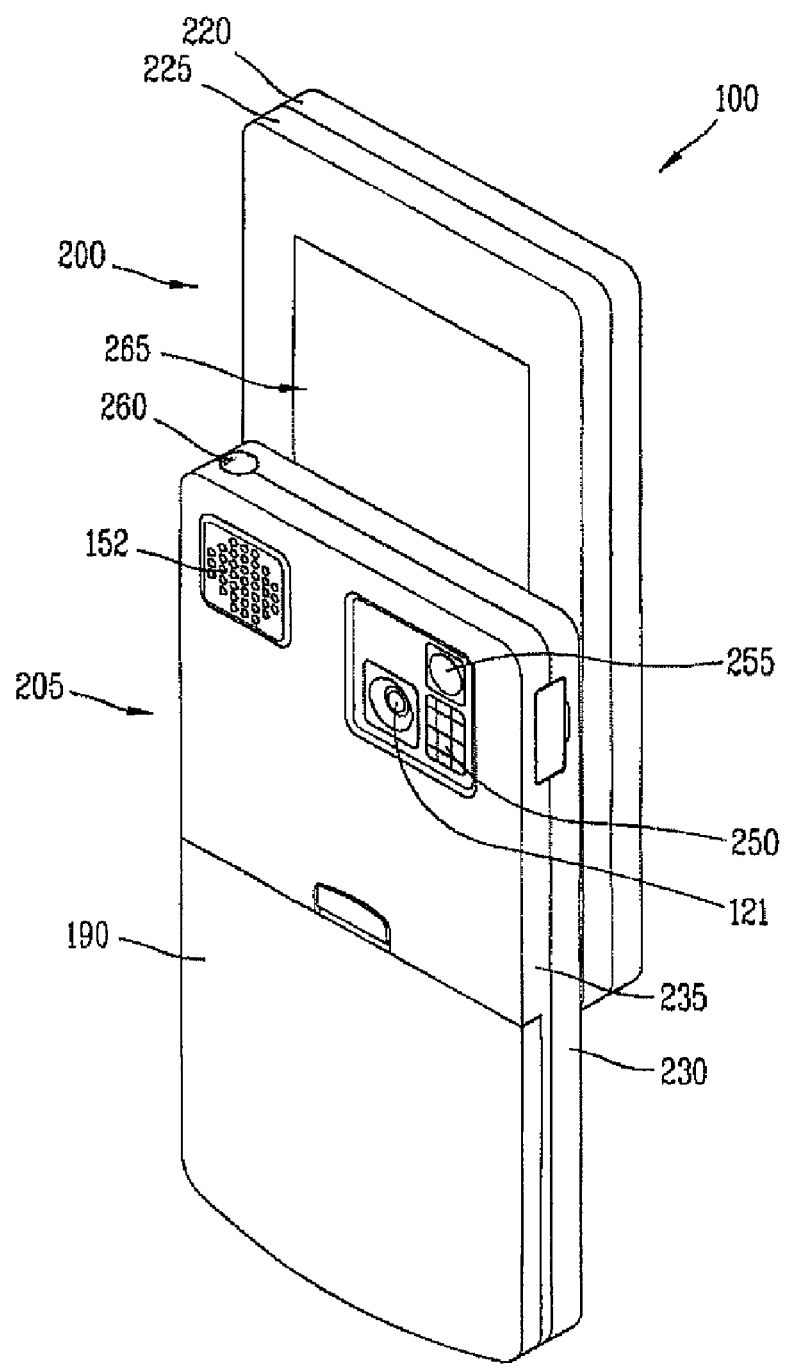
FIG. 3 is a rear perspective view of the mobile terminal according to one exemplary embodiment.

FIG. 3 is a rear perspective view of the mobile terminal according to one exemplary embodiment.

A second camera 121 may be additionally mounted on the rear surface of the second rear case 235 of the second body 205. The second camera 121 may have an image capture direction which is substantially the opposite to that of the first camera 121 (See FIG. 1), and may support a different number of pixels (i.e., have a different resolution) when compared to the first camera 121.

For example, the first camera 121 may be used for low resolution (i.e., supporting a relatively small number of pixels) to quickly capture an image (or video) of the user's face for immediately transmission to another party during video conferencing or the like, while the second camera 121 may be used for high resolution (i.e., supporting a relatively large number of pixels) in order to capture more detailed (higher quality) images or video which typically do not need to be transmitted immediately.

A flash 150 and a mirror 255 may be disposed to be adjacent to the second camera 121. When an image of the subject is captured with the second camera 121, the flash 150 illuminates the subject. The mirror 255 allows the user to see himself when he wants to capture his own image (i.e. perform self-image capturing) by using the second camera 121.

The second audio output module 152 may be additionally disposed on the second rear case 235, and may implement a stereophonic function in conjunction with the first audio output module 152 (See FIG. 2), and may be also be used in a speaker phone mode.

A broadcast signal reception antenna 260 may be disposed at one side of the second rear case 235, in addition to an antenna used for call communication. The antenna 260 may be installed such that it can be extended from the second body 205.

One part of the slide module 265 that slidably connects the first body 200 with the second body 205 may be disposed on the first rear case 225 of the first body 200. The other part of the slide module 265 may be disposed on the second front case 230 of the second body 205, which may not be exposed as shown in FIG. 3.

In the above description, the second camera 121 and the like are disposed on the second body 205, but such exemplary configuration is not meant to be limiting.

For example, one or more of the elements 260 and 121 or 150 and 152 which are disposed on the second rear case 235 may alternatively be mounted on the first body 200 (mainly, on the first rear case 225). In this case, those elements disposed on the first rear case 225 can be protectively covered by the second body 205 in the closed configuration. In addition, even if a second camera 121 is not implemented, the first camera 121 may be configured to rotate (or otherwise be moved) to thus allow image capturing in various directions.

An exemplary configuration of the mobile terminal that changes a display position of the user interface based on user selection according to the present invention will now be described in detail with reference to FIGS. 1 to 3.

Such mobile terminal includes the display 151 and the controller 180. The display 151 is implemented in the form of the touch screen combined with the touch pad, and the touch pad serves to receive a touch input signal of the user and transfers the same to the controller 180.

In addition, the display 151 can be divided into a plurality of display regions, such as an information display region 310 and at least one user interface display region 320. The information display region 310 (or a particular region of the screen) is for displaying various types of information (such as multimedia data, broadcast programs, games, etc.) provided according to the operation of the mobile terminal, and the user interface display region 320 is for displaying a user interface.

Here, the position (i.e., screen location) of the information display region 310 and the user interface display region 320 outputted on the display 151 may be varied according to the user selection and/or varied automatically based upon certain display characteristics.

Figure 4:
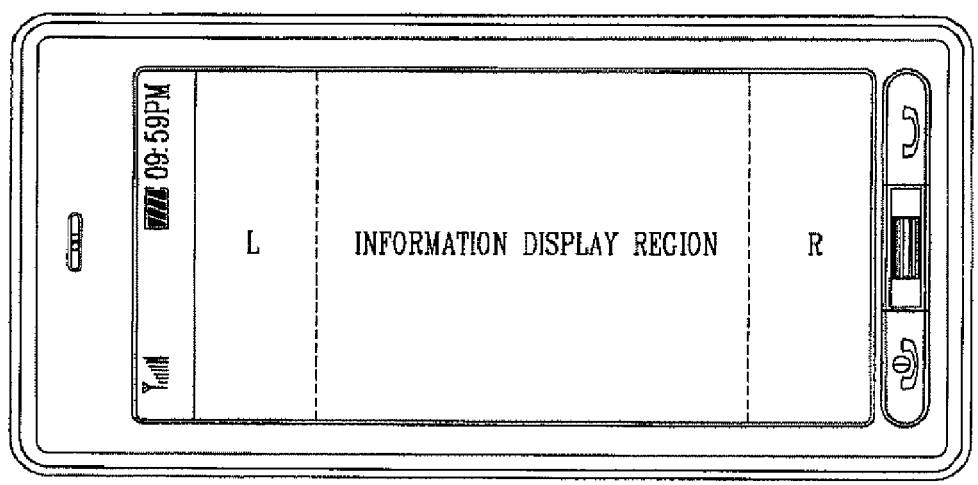
FIG. 4 shows an active region allocated to a display of the mobile terminal according to one exemplary embodiment.

The user selection may be performed upon a touch event occurring on the display 151. The user may select a desired region where a particular user interface is to be positioned (shown) by touching the desired region on the display 151. For this purpose, one or more regions (e.g., the active regions labeled as R and L to denote right and left portions as shown in FIG. 4) that are defined as regions where a particular user interface is to be shown may be previously allocated (or pre-set). In this case, the active regions (R and L) show soft keys (or other screen buttons that can be activated by being touched) as part of the displayed graphical user interface.

The controller 180 checks whether a touch event occurs at one or more of the active regions (R or L). In this case, in order to prevent the displayed user interface from moving (or performing other undesired actions) due to erroneous contact or touching, certain touch event generation conditions may be set.

For example, the touch event generation conditions may be set based upon various conditions, such as a touch duration time, a touch pressure, the number of touches, and the like. When the user performs a touch input and based on the set conditions, the controller 180 may regard such touch event as a request to move the user interface position and ask the user how the user interface should be moved.

When a touch event that satisfies the conditions occurs at one of the active regions (R or L), the controller 180 provides appropriate control to display the user interface on the active region (R or L) where the touch event has occurred. When another touch event occurs at a different active region (L or R), the controller 180 moves the user interface to the different active region (R or L) where the touch event has occurred. The user interface may be moved without any change in its size (i.e., as originally displayed) or the size of the entire user interface itself (as well as other features displayed thereon, such as the graphical control keys) may be suitably adjusted according to pre-set conditions.

According to a drag input (that may be performed by swiping the user's finger on the screen) starting from a boundary area between the information display region 310 and the user interface display region 320, the controller 180 may expand or contract the user interface display region 320 to match a size of a portion (or distance) dragged from the boundary. In this case, the controller 180 may re-adjust the size of the information display region 310 or display an expanded overlap portion transparently (or semi-transparently) according to the change in the user interface display region 320, or appropriately change the position, size (or other visual characteristics) of the various control keys (or other graphically displayed elements) constituting the user interface displayed on the user interface display region 320.

When there is no input to the user interface for a certain time period, the controller 180 may remove the user interface display region 320 and change the information display region 310 to the entire portions of the screen.

In an exemplary embodiment, the user selection is performed when a touch event is generated, but without being limited thereto, a modification may be possible such that the user selection is performed by pressing a particular key (such as a hot key of the key input unit) a certain number of times or depressing such key for a certain time duration.

The mobile terminal may further include a sensing unit 140 for sensing (detecting) the physical orientation of the mobile terminal. For example, the sensing unit 140 can tell if the mobile terminal is held by the user in the portrait display orientation, landscape display orientation, tilted at some angle, or the like.

The sensing unit 140 may be implemented as a terrestrial magnetism sensor that measures (senses) the strength and direction of the earth's magnetic fields. The mobile terminal can thus determine how the mobile terminal is oriented by using the sensing unit 140 and displays the user interface accordingly.

Figure 5:
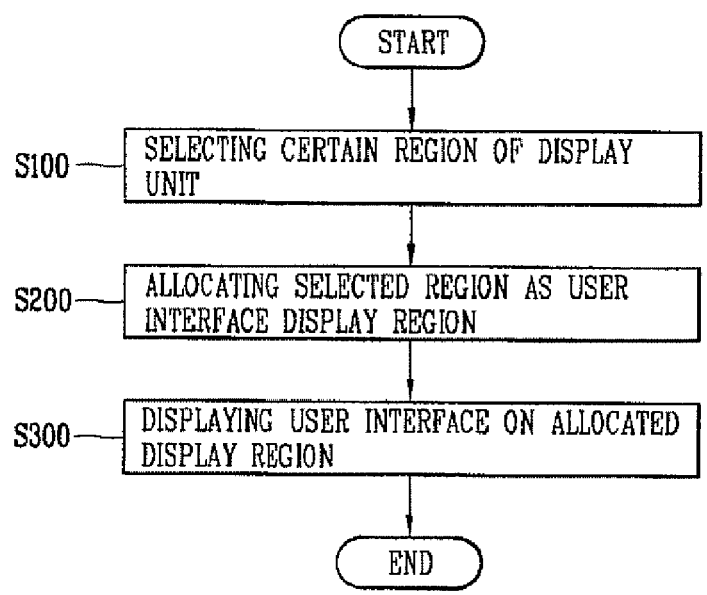
FIG. 5 is a flow chart illustrating an exemplary process of a screen display method according to one exemplary embodiment.

FIG. 5 shows a flow chart illustrating an exemplary process of a screen display method according to the exemplary embodiment.

When the user selects a certain region (R or L) by touching the display 151, information about the touched position is transferred to the controller 180 (S100).

If the display 151 is implemented as a touch screen, the user selection is performed according to a touch event (detected based on certain pre-set values) occurring at an active region allocated to the touch screen. The pre-set value may be set according to at least one condition, such as, touch (time) duration, touch pressure, the number of touches, and the like. In addition, the user selection may be performed by activating a particular key (such as a hot key on the key input unit).

For the display screen, the controller 180 allocates an active region (R or L) corresponding to the touched position to be part of the user interface display region 320, and allocates the remaining region as the information display region 310 (S200). In this case, the controller 180 can provide control to re-adjust the size of the information display region 310 according to the size of the user interface display region 320. The controller 180 provides control to display a user interface on the allocated user interface display region 320 and various information according to an operation of the mobile terminal on the information display region 310.

As described above, the user interface may be divided into the two (or more) separated regions with the information display region 310 interposed therebetween, and if the information display region 310 includes a main screen portion 312 and a sub-screen portion 314, corresponding user interfaces may be separately displayed to allow control thereof.

Figure 6:
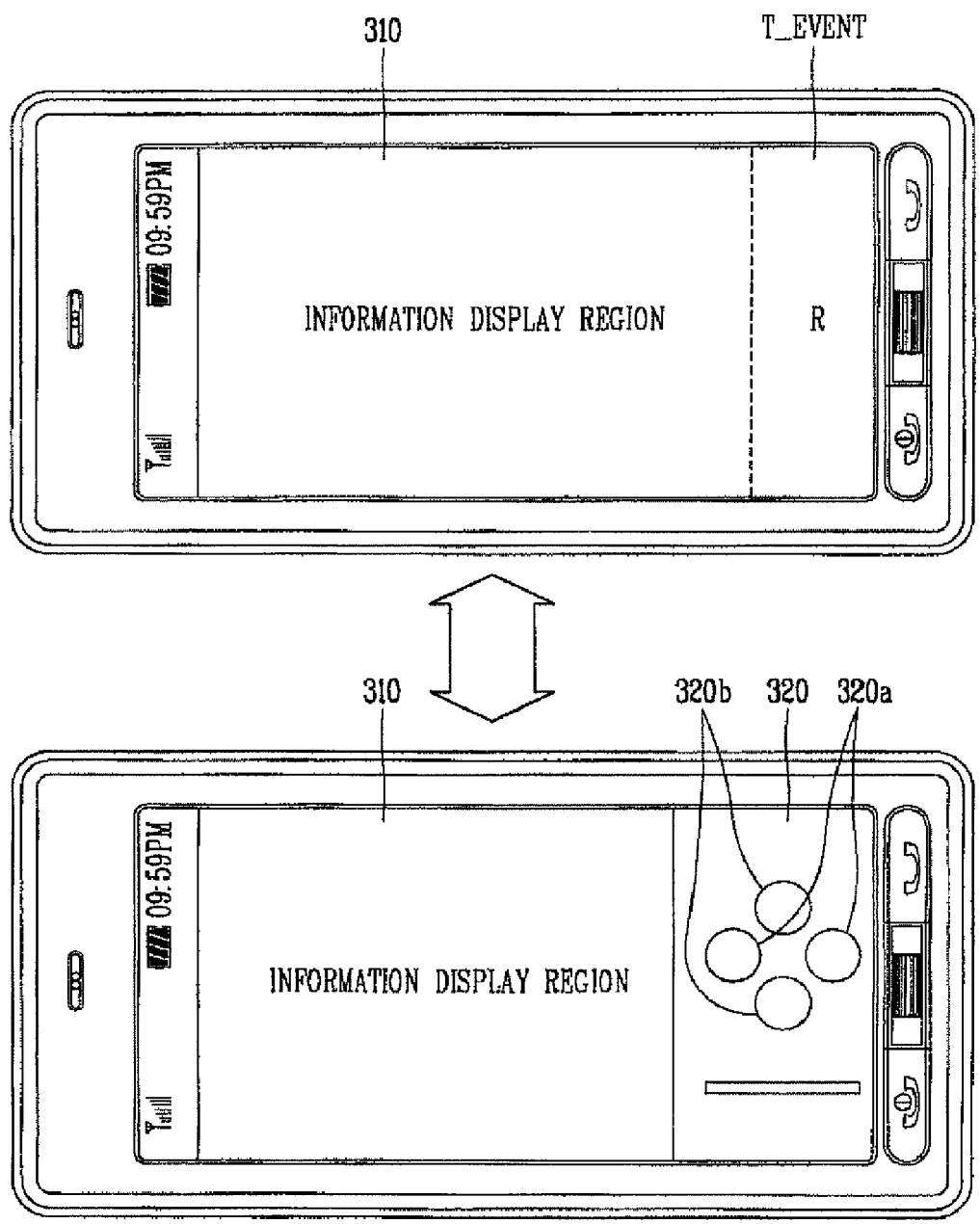
FIG. 6 shows an exemplary screen display of a user interface of the mobile terminal according to one exemplary embodiment.

FIG. 6 shows a screen displaying a user interface of the mobile terminal according to one exemplary embodiment.

When a touch event (T_event) occurs at the active region (R) allocated to a right-hand portion of the information display region 310 (as shown in FIG. 6) while certain information is being displayed on the information display region 310, the display 151 informs the controller 180 accordingly. Then, the controller 180 allocates the active region (R), at which the touch event (T_event) occurred, as a user interface display region 320 and displays a user interface on the corresponding display region 320. Here, the controller 180 changes the size of the information display region 310 according to the size of the user interface display region 320. In other words, the size of the information display region 310, which is originally the same as the entire screen of the display 151, is reduced to a size that covers a screen portion that remains upon excluding the user interface display region 320.

Thereafter, when a user input is not detected on the user interface display region 320 for a certain time period, the controller 180 removes (deletes or cancels) the user interface display region 320 and changes (expands) the reduced information display region 310 to the entire screen in display.

Figure 7:
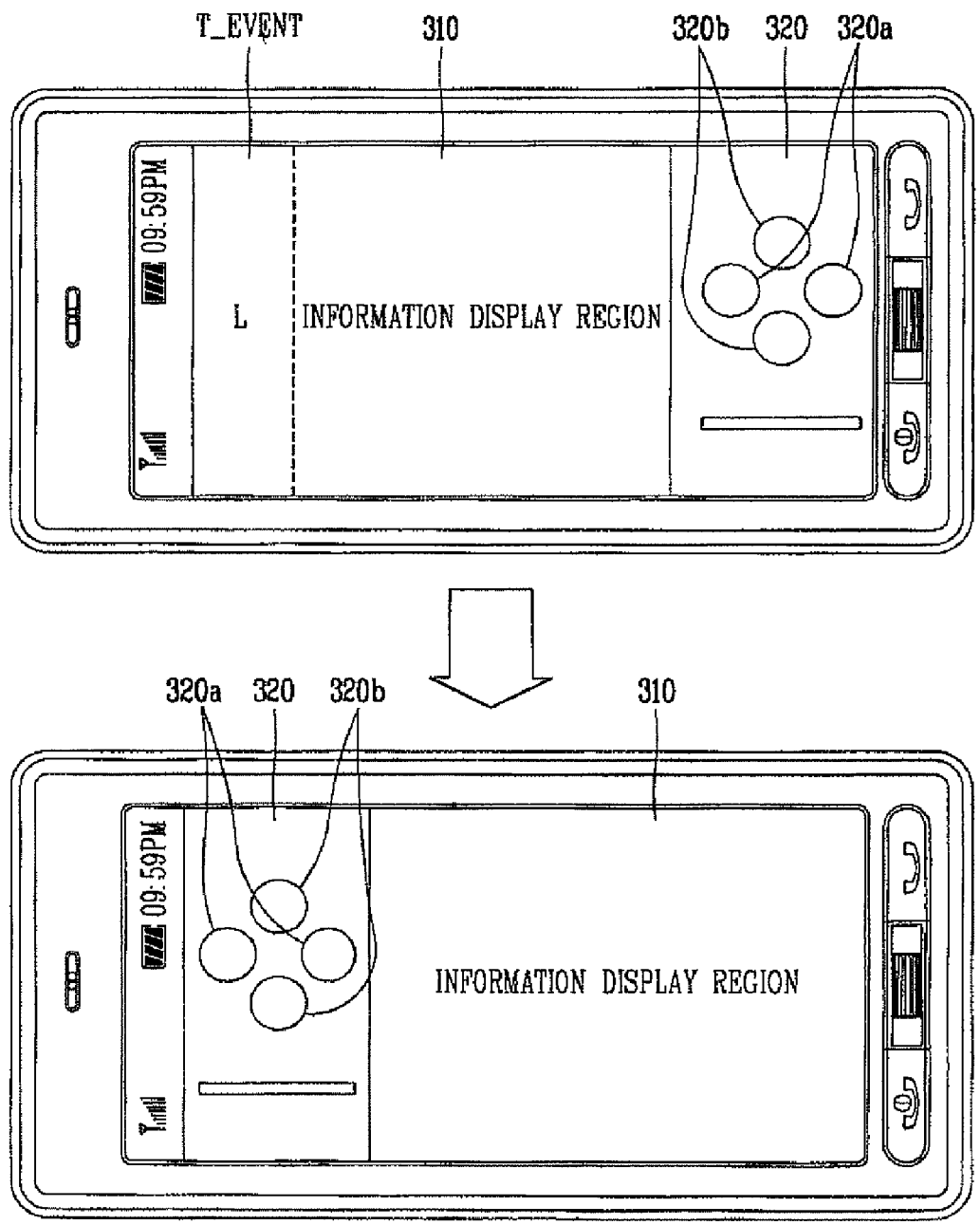
FIG. 7 shows an exemplary screen display of a user interface of the mobile terminal according to another exemplary embodiment.

FIG. 7 shows a screen displaying a user interface of the mobile terminal according to another exemplary embodiment.

When a touch event (T_event) occurs at the active region (L) allocated to a left-hand portion of the information display region 310 (as shown in FIG. 7) while a user interface is being displayed at the right-hand portion of the information display region 310, the display 151 informs the controller 180 accordingly. The controller 180 allocates the left portion defined as the active region (L) as a user interface display region 320. Subsequently, the controller 180 provides control to display a user interface on the user interface display region 320. In this case, the position of the information display region 310 moves according to the movement of the position of the user interface display region 320. In other words, as shown in FIG. 7, when the position of the user interface display region 320 is changed from the right portion to the left portion, the position of the information display region 310 is changed from the left portion to the right portion.

Figure 8:
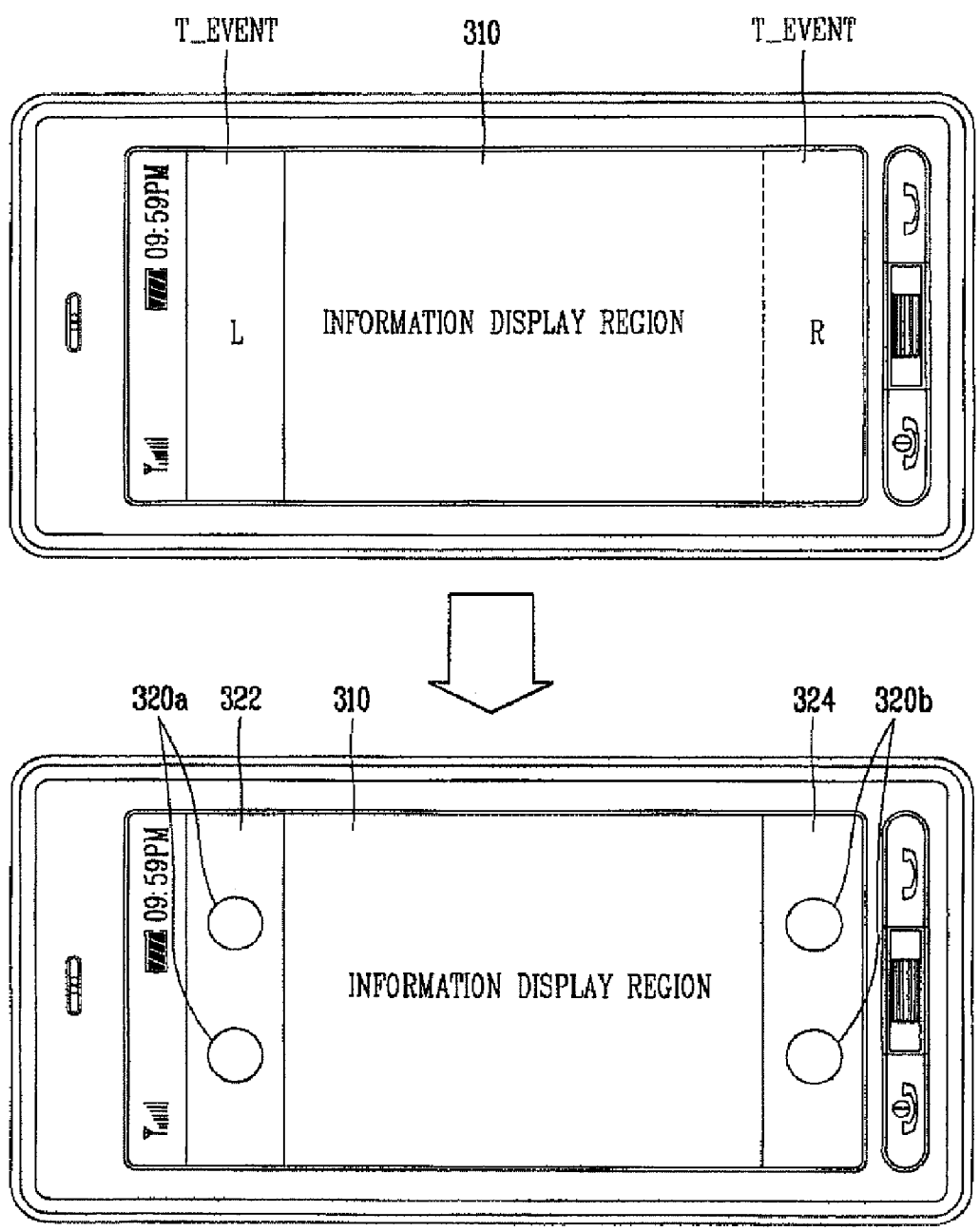
FIG. 8 shows an exemplary screen display of a user interface of the mobile terminal according to another exemplary embodiment.

FIG. 8 shows a screen displaying a user interface of the mobile terminal according to another exemplary embodiment.

When a touch event (T_event) occurs at both the active region (R) allocated to the right-hand portion of the information display region 310 and the active region (L) allocated to the left-hand portion of the information display region 310, the controller 180 allocates the active regions (R and L) as first and second user interface display regions 322 and 324. Here, the first and second user interface display regions 322 and 324 are disposed at both sides of the information display region 310.

In this case, the displayed graphical control keys of the user interfaces for receiving user inputs are divided into the first and second user interfaces 320a and 320b and respectively disposed on the first and second user interface display regions 322 and 324. For example, when the user interfaces of the user interface display region 320 include the volume and channel control keys 320a and 320b, the volume control keys 320a may be displayed on the first user interface display region 322 and the channel control keys 320b may be displayed on the second user interface display region 324.

Figure 9:
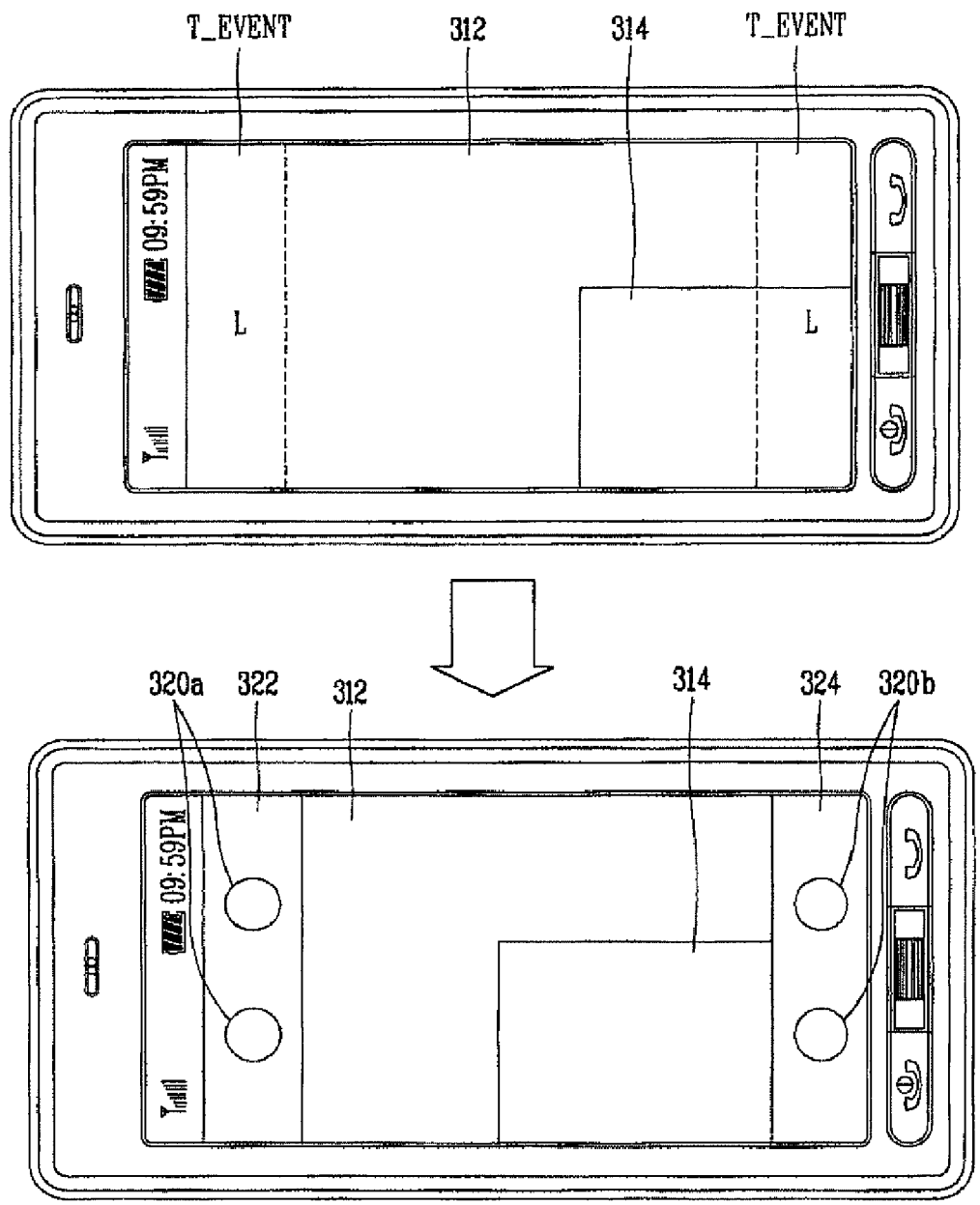
FIG. 9 shows an exemplary screen display of a user interface of the mobile terminal according to another exemplary embodiment.

FIG. 9 shows a screen displaying a user interface of the mobile terminal according to another exemplary embodiment.

When the information display region 310 includes a main screen 312 and a sub-screen 314, the main screen 312 is disposed to be controlled by the control keys 320a included in the first user interface display region 322 and the sub-screen 314 is disposed to be controlled by the control keys 320b included in the second user interface display region 324.

In the above drawings, the active regions are positioned at the right and left portions, but without being limited thereto, a plurality of active regions may be disposed, and may be modified to be positioned at various locations (such as the upper and lower portions) of the display 151 or at upper/lower and left/right portions thereof.

Figure 10:
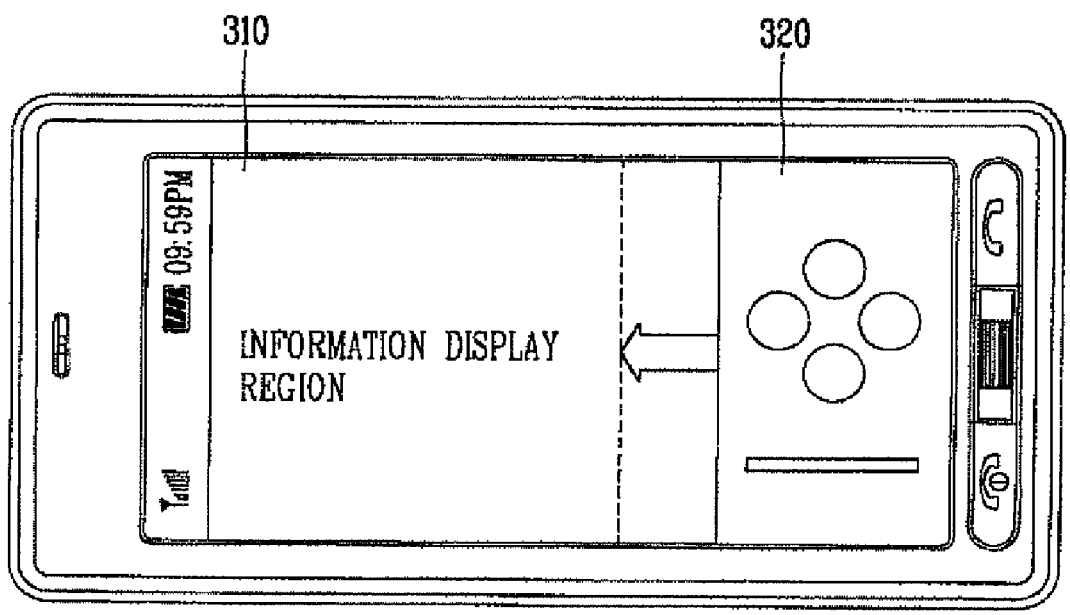
FIG. 10 shows an exemplary screen display of a user interface of the mobile terminal according to another exemplary embodiment.

FIG. 10 shows a screen displaying a user interface of the mobile terminal according to another exemplary embodiment.

When a drag input is detected at a boundary between the information display region 310 and the user interface display region 320, the controller 180 may adjust (i.e., extend or contract) the user interface display region 320 to match the size of a region dragged from the boundary. In this case, the controller 180 re-adjusts the size of the information display region 310 or displays the extended overlap portion in a semi-transparent (or translucent, transparent, etc.) manner, according to the change in the user interface display region 320. The controller 180 then provides control to suitably re-adjust the positions of size of the control keys displayed on the user interface display region 320.

Figure 11:
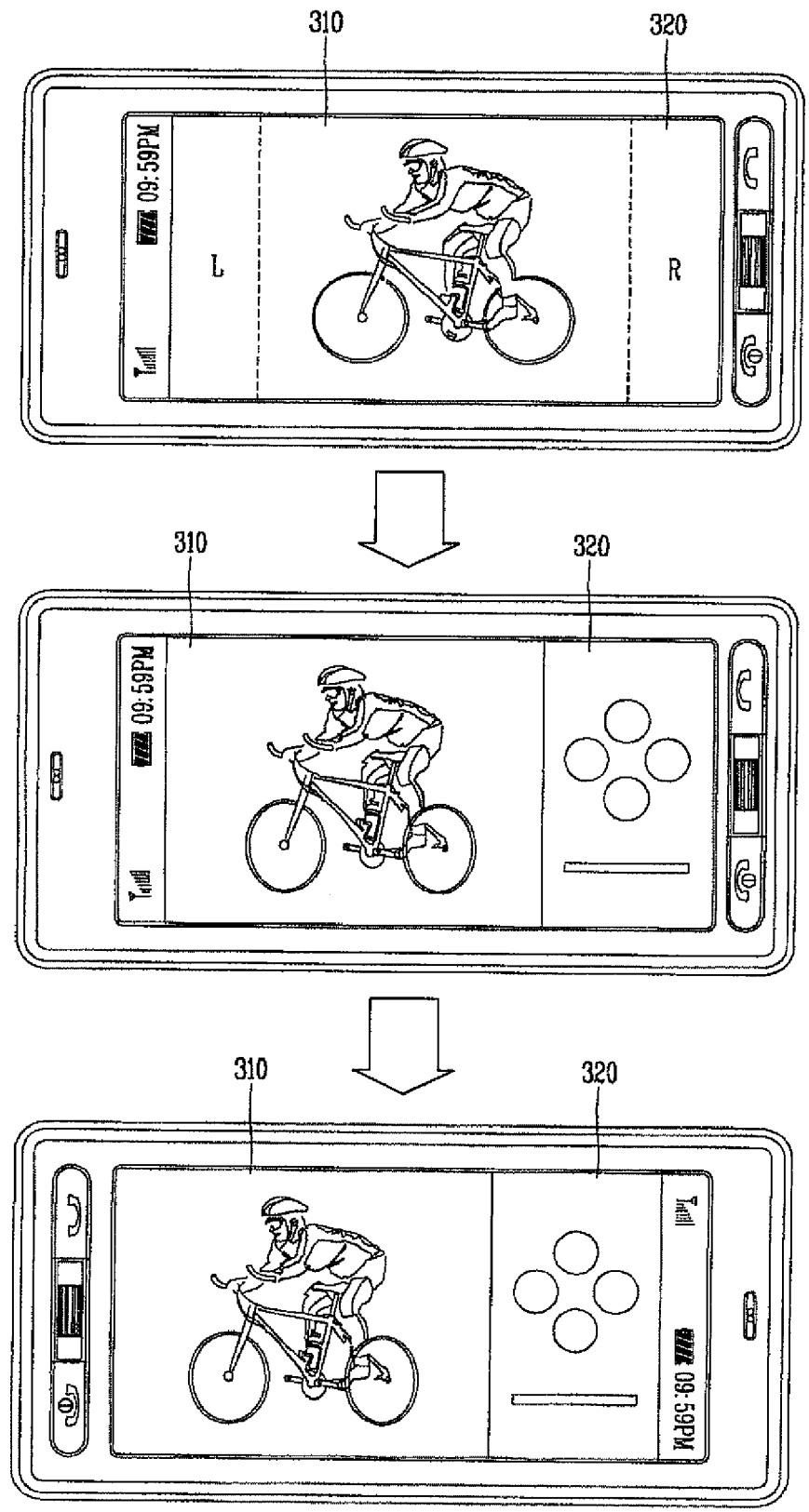
FIG. 11 shows an exemplary screen display of a user interface of the mobile terminal according to another exemplary embodiment.

FIG. 11 shows a screen displaying a user interface of the mobile terminal according to another exemplary embodiment.

When the user rotates (flips around) the mobile terminal (i.e., changes the way that he holds the mobile terminal) in a state that the active region allocated to the right portion of the display 151 is selected, the controller 180 allocates the selected active region as the user interface display region 320 and the other remaining region as the information display region 310. The controller 180 detects the physical orientation of the mobile terminal by using the sensing unit 140 and displays the user interface and other information in an appropriate manner according to the detected physical orientation.

Accordingly, even if the mobile terminal is flipped around (i.e., rotated in a planar manner by 180 degrees) as shown in FIG. 11, the display position of the user interface selected by the user can be displayed on the selected position in the same manner without any changes when viewed by the user.

Figure 12:
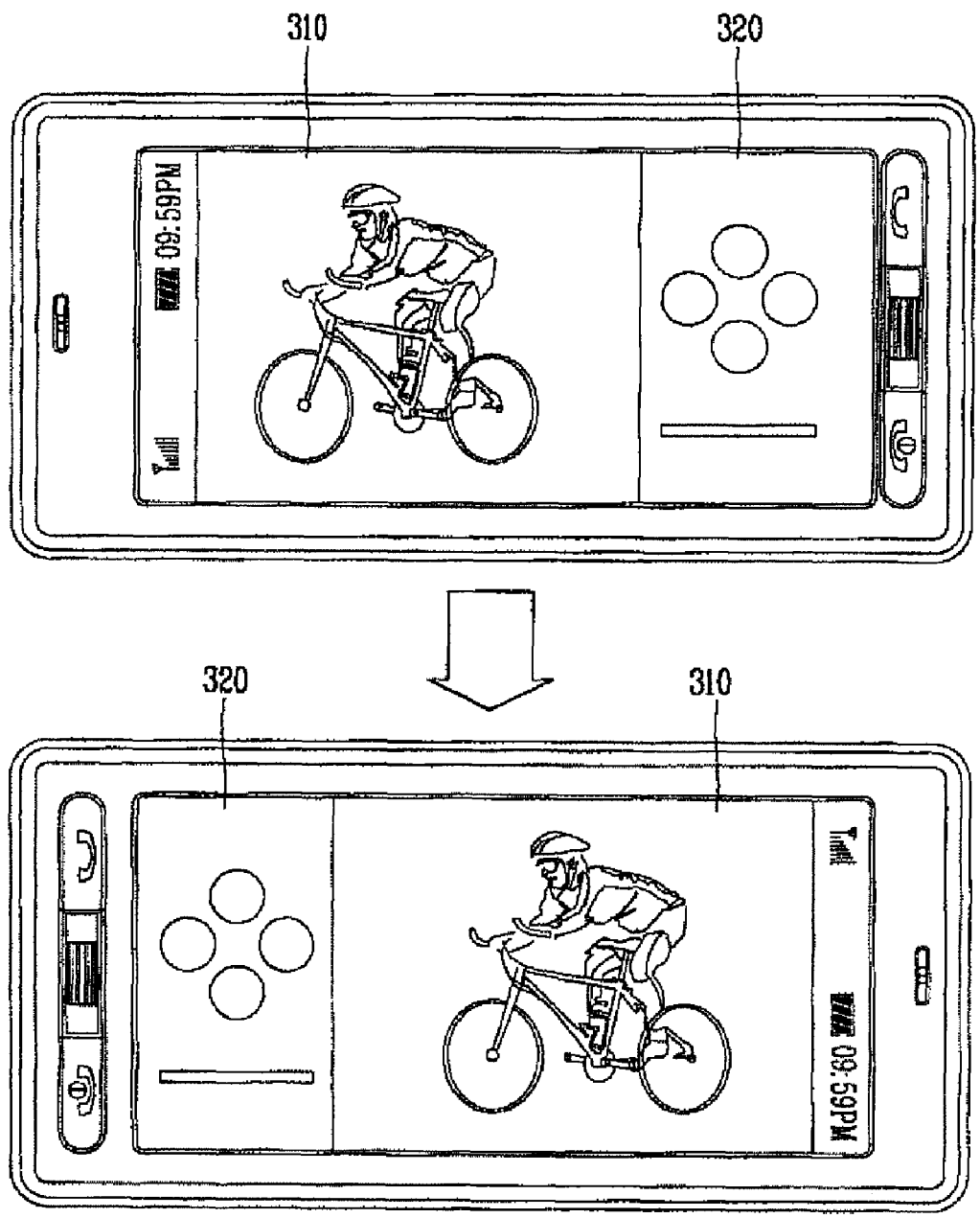
FIG. 12 shows an exemplary screen display of a user interface of the mobile terminal according to another exemplary embodiment.

FIG. 12 shows a screen displaying a user interface of the mobile terminal according to another exemplary embodiment.

When the user flips around the mobile terminal (i.e., rotates in a planar manner by 180 degrees) in a state that the user interface is being displayed on the right portion of the display 151, the controller 180 calculates the rotation amount (degree) of the mobile terminal by using the sensing unit 140.

The controller 180 changes the positions of the user interface display region 320 and the information display region 310 on the display according to the calculated rotation degree. Subsequently, the controller 180 displays the user interface display region 320 and the information display region 310 in the same manner even if the mobile terminal is flipped. For example, when the user rotates the mobile terminal in a planar manner by 180° in the state that the user interface is displayed at the right portion of the display 151, the user interface is then displayed on the left portion of the display 151, as can be understood by viewing FIG. 12.

In this manner, the user can change the display location of the user interface by rotating (or moving) the mobile terminal without having to touch a certain region of the display 151 whenever the user wants to change the display location of the user interface.

The concepts and features described herein can be summed up as follows. A mobile terminal (or other electronic device having a display means, such as a touch screen, dual-screen, multiple displays, etc.) includes a controller (e.g., a CPU, microprocessor, etc.) that cooperates with the display means (and other components) such that an appropriate graphical user interface (GUI) is shown on the screen. Such GUI may comprise on-screen graphical soft keys (or other activation regions) and that can be touched by the user when playing games, graphical icons or buttons that can be touched to activate various functions (e.g., multimedia player features), and the like.

One or more types of GUI regions may be displayed at different locations or positions on the screen. For example, if the user holds his mobile terminal to be used as a game controller (where the screen is in a landscape view orientation), the game contents can be shown at a central region of the mobile terminal screen, while the user's left hand thumb (or fingers) can be used to touch graphical buttons displayed on a left-side area of the screen and the user's right hand thumb (or fingers) can be used to touch graphical buttons displayed on a right-side area of the screen, as can be understood by the Figures of this disclosure. Of course, the GUI regions may be shown at different portions on the screen, such as the top, bottom, or sides thereof.

The one or more GUI regions can be displayed in a relatively transparent manner to allow viewing of other items on the screen. Also, the particular characteristics of the GUI regions (e.g., its size, shape, contents, etc.) can be adjusted in various ways depending upon the specific application being used (e.g., game playing, movie viewing, image capturing, etc.). The GUI regions can be temporarily displayed and (partially or fully) hidden from view as desired by the application or functions being used.

Also, various types of user inputs (tactile, audible, etc.) can be recognized. Single or multiple taps, single finger or dual-finger swipes, drag and drop techniques, voice commands, and the like can be used to activate various functions related to the GUI regions.

Additionally, a sensing means (e.g., a terrestrial magnetism sensor, movement acceleration detectors, etc.) can be used to detect how the user physically moves around (or holds, handles, manipulates, etc.) the mobile terminal (e.g., flipping around, tilting at an angle, rotating in a planar manner, etc.). Based on such detection, the controller then provides appropriate control in order to display the graphical user interface in an adequate manner to provide enhanced user convenience.

As so far described, the position (location) of the user interface can be changed (adjusted, altered, etc.) according to a user selection, so the user interface can be easily manipulated and thus user convenience can be maximized.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile communication terminal comprising:
   a display screen having at least one user interface display region configured to display a graphical user interface and an information display region configured to display graphical information;
   a touch sensor configured to detect touch events occurring on the display screen; and
   a processor configured to;
   process a first touch event detected by the touch sensor that occurs at the at least one user interface display region;

control the display screen to display the graphical user interface in the at least one user interface display region when the first touch event is detected, wherein the graphical user interface is displayed on two opposing locations along a boundary of the display screen and comprises a plurality of graphical control keys each defined to perform a particular function;

process a second touch event detected by the touch sensor that occurs at a graphical control key of the plurality of graphical control keys of the displayed graphical user interface; and perform the particular function corresponding to the graphical control key on which the second touch event was detected.

2. The mobile communication terminal of claim 1, wherein one of the two opposing locations is along a left boundary of the display screen and the other of the two opposing locations is along a right boundary of the display screen.

3. The mobile communication terminal of claim 1, wherein one of the two opposing locations is along a top boundary of the display screen and the other of the two opposing locations is along a bottom boundary of the display screen.

4. A mobile communication terminal comprising:

a display screen having at least one user interface display region configured to display a graphical user interface and an information display region configured to display graphical information;

a touch sensor configured to detect touch events occurring on the display screen; and a processor configured to:

process a first touch event detected by the touch sensor that occurs at the at least one user interface display region of the display screen;

control the display screen to display the graphical user interface only on a corresponding user interface display region of the at least one user interface display region on which the first touch event was detected, wherein the corresponding user interface display region is located along a left or right boundary of the display screen;

detect a dragging operation on the display screen at a boundary between the information display region and the at least one user interface display region;

control the display screen to adjust a size of the corresponding user interface display region according to the detected dragging operation; and control the display screen to remove the displayed graphical user interface from the corresponding user interface display region if a second touch event is not detected for a predetermined time period.

5. The mobile communication terminal of claim 4, wherein:

the displayed graphical user interface comprises a plurality of graphical control keys each defined to perform a particular function; and the processor is further configured to process the second touch event detected by the touch sensor that occurs at a graphical control key of the plurality of graphical control keys of the displayed graphical user interface.

6. The mobile communication terminal of claim 5, the processor is further configured to perform the particular function corresponding to the graphical control key on which the second touch event was detected.

7. The mobile communication terminal of claim 4, wherein the processor is further configured to control the display screen to display the graphical user interface at the entire corresponding user interface display region.

8. The mobile communication terminal of claim 4, wherein the graphical user interface comprises at least one graphical icon.

9. The mobile communication terminal of claim 4, wherein the processor is further configured to:

detect user activation of a particular key; and control the display screen to display the graphical user interface within the corresponding user interface display region.

10. The mobile communication terminal of claim 4, wherein the processor is further configured to control the display screen to display visual indicators of antenna reception signal strength, local time, and battery power status.

11. The mobile communication terminal of claim 4, wherein an expanded overlap portion of the corresponding user interface display region and the information display region is displayed transparently or semi-transparently.

12. A screen display method of a mobile terminal, the method comprising:

detecting a first touch event occurring at at least one user interface display region of a display of the mobile terminal, wherein the display has an information display region configured to display graphical information and the at least one user interface display region configured to display a graphical user interface;

displaying the graphical user interface only on a corresponding user interface display region of the at least one user interface display region on which the first touch event was detected, wherein the corresponding user interface display region is located along a left or right boundary of the display screen;

detecting a dragging operation at a boundary between the information display region and the at least one user interface display region;

adjusting a size of the corresponding user interface display region according to the detected dragging operation; and removing the displayed graphical user interface from the corresponding user interface display region if a second touch event is not detected for a predetermined time period.

13. The method of claim 12, wherein the graphical user interface comprises a plurality of graphical control keys each defined to perform a particular function and further comprising detecting the second touch event occurring a graphical control key of the plurality of graphical control keys of the displayed graphical user interface.

14. The method of claim 13, further comprising performing the particular function corresponding to the graphical control key on which the second touch event was detected.

15. The method of claim 12, further comprising displaying the graphical user interface at the entire corresponding user interface display region.

16. The method of claim 12, wherein the graphical user interface comprises at least one graphical icon.

17. The method of claim 12, further comprising:

detecting user activation of a particular key; and displaying the graphical user interface within the corresponding at least one user interface display region.

18. The method of claim 12, further comprising displaying visual indicators of antenna reception signal strength, local time, and battery power status.

19. The method of claim 12, wherein an expanded overlap portion of the corresponding user interface display region and the information display region is displayed transparently or semi-transparently.

* * * * *